United States Patent [19]
Farine et al.

[11] Patent Number: 5,862,046
[45] Date of Patent: Jan. 19, 1999

[54] CONTINUOUS ELECTRIC POWER SUPPLY CIRCUIT REGULATED BY A REVERSIBLE CONVERTER

[75] Inventors: Pierre-André Farine, Neuchâtel; Rudolf Dinger, St. Aubin; Eric Saurer, Bevaix, all of Switzerland

[73] Assignee: Asulab S.A., Bienne, Switzerland

[21] Appl. No.: 893,675

[22] Filed: Jul. 11, 1997

[30] Foreign Application Priority Data

Jul. 16, 1996 [FR] France .................................. 96 08870

[51] Int. Cl.$^6$ .................................................. H02M 7/10
[52] U.S. Cl. .................................................. 363/50
[58] Field of Search ........................ 363/50, 59, 60; 307/43, 46, 48, 49, 66

[56] References Cited

U.S. PATENT DOCUMENTS

| | | | |
|---|---|---|---|
| 4,279,010 | 7/1981 | Morihisa ................................. | 363/60 |
| 4,451,743 | 5/1984 | Suzuki et al. ........................... | 363/59 |
| 4,908,523 | 3/1990 | Snowden et al. ...................... | 307/43 |

FOREIGN PATENT DOCUMENTS

| | | |
|---|---|---|
| 0 508 664 | 10/1992 | European Pat. Off. . |
| 42 26 529 | 2/1994 | Germany . |
| WO 91/12644 | 8/1991 | WIPO . |

OTHER PUBLICATIONS

Patent Abstracts of Japan vol. 018, No. 332 (E–1567), 23 Jun. 1994 & JP 06 078473A (Japan Storage Battery Co Ltd; Others:01), 18 Mar. 1994.
Patent Abstracts of Japan vol. 018, No. 515 (E–1611), 28 Sep. 1994 & JP 06 178461A (Japan Storage Battery Co Ltd), 24 Jun. 1994.
Patent Abstracts of Japan, vol. 096, No. 003, 29 Mar. 1996 & JP 07 298516A (Yuasa Corp), 10 Nov. 1995.
Patent Abstracts of Japan vol. 095, No. 006, 31 Jul. 1995 & JP 07 059271A (S II Project KK), 3 Mar. 1995.

*Primary Examiner*—Matthew Nguyen
*Attorney, Agent, or Firm*—Griffin, Butler, Whisenhunt & Szipl, LLP

[57] ABSTRACT

This invention provides protection against power supply failure, in particular of electronic circuits of timepieces powered by photovoltaic batteries. The invention comprises a continuous electric power supply comprising: an electrical continuous source (G) coupled to a power output (VDD, GND); energy storing means (6); and a reversible dc/dc electric converter (5) coupled both to the power output (VDD, GND) and to the energy storing means (6). The converter (5) comprises switching means (T1, T2, T3, T4) for modifying its configuration. The power supply storing means (6) comprise essentially a capacitor (C). Preferably, the reversible converter (5) is a dc/dc converter, the converter being a voltage multiplier in a first configuration and being a voltage divider in a second configuration.

20 Claims, 2 Drawing Sheets

5,862,046

CONTINUOUS ELECTRIC POWER SUPPLY CIRCUIT REGULATED BY A REVERSIBLE CONVERTER

BACKGROUND OF THE INVENTION

The present invention concerns in a general manner the field of continuous electric power supply circuits, in particular for timepieces.

Some timepieces comprise in fact a solar cell, or an other intermittent electrical source, which provides the necessary electrical energy to an electric movement and/or to electronic circuits, for example, for the regulation of the movement. Unfortunately, when the timepieces is not illuminated, the photovoltaic cell does not anymore provide electricity. To avoid the interruption of the movement or the functioning of the electronic circuit, it is necessary to provide an energy storing device, such as a capacitor, which is connected between the solar cell and the circuit/movement in question for storing the energy provided by the solar cell when it is producing such. This energy storing device is then used as a direct power supply source of the circuit/movement.

However, the supply voltage needed to operate several circuits/movements is often very low. This is in particular the case in low power circuits in the field of watches. Given the fact that the quantity of energy E which may be stored by using such an energy storing device is a function of the supply voltage U which it provides (for a capacitor, for example, this function is given by the formula $E=\frac{1}{2}.C.U^2$ in which C is the capacity of the capacitor), this stored quantity of energy is limited. Consequently, the functioning of the circuit/movement can only be assured for a reduced period of time after the end of the illumination of the solar cell.

To overcome these inconveniences, it would be possible to add a secondary or a backup power supply in such a supply circuit. This backup supply may be obtained by an electrical battery or even by an electrochemical accumulator which stores energy, such as a nickel-cadmium (Ni-Cd) battery and could be used as a supply source in the case that the energy stored by an energy storing source is exhausted. However, these components have the inconvenience of being large and of having a limited life-time.

SUMMARY OF THE INVENTION

An aim of the present invention is to provide an electric continuous supply circuit which overcomes at least partially, these inconveniences.

Another aim of the invention is to provide an electric continuous supply circuit occupying minimal space.

The invention also has as aim to provide an electric continuous supply circuit which allows for a long supply life-time.

Another aim of the invention is also to provide an electric continuous supply circuit which is simple and which requires a small number of components for its fabrication.

Finally, the invention has as aim to provide a miniature supply device which is well adapted to watch applications.

The invention thus has as object a continuous supply circuit, in particular for a timepiece, comprising a power supply source of said electronic circuit arranged to store energy for supplying the latter; and an intermittent electric source intended to provide energy to said supply source. The supply circuit is characterised in that it further comprises secondary energy storing means arranged to provide energy to said power supply source when said intermittent electric source does not provide energy to said power supply source; and an electric dc/dc reversible converter coupled, on the one hand, to said power supply source, and, on the other hand, to the secondary energy storing means, the converter comprising switching means which modifie the converter's configuration between a first configuration in which the converter transfers, in a forward direction, the energy coming from the intermittent electric source to the secondary energy storing means, and a second configuration in which the converter releases, in the opposite direction, the energy stored by the secondary energy storing means to said power supply source.

Such a converter allows in fact to recharge the secondary energy storing means at a high voltage. In case of failure of the power supply, the reversible converter releases this energy to the supply circuit. Preferably, the energy is released at a normal supply voltage $V_{DD}$ which has a low value with respect to the charging voltage U. This disposition allows to supply electronic circuits or motors which have a low consumption, thus further increasing the lifetime of the timepiece.

The invention is preferably embodied by a reversible dc/dc converter, this converter converting a continuous voltage to another continuous voltage and being a voltage multiplier in the first configuration and being a voltage divider in the second configuration.

BRIEF DESCRIPTION OF THE SEVERAL VIEWS OF THE DRAWINGS

Other features and advantages of the present invention will appear when reading the description and the drawings which follow, given solely by way of a non-limitative example, and in which.

DETAILED DESCRIPTION OF THE INVENTION

Figure 1:
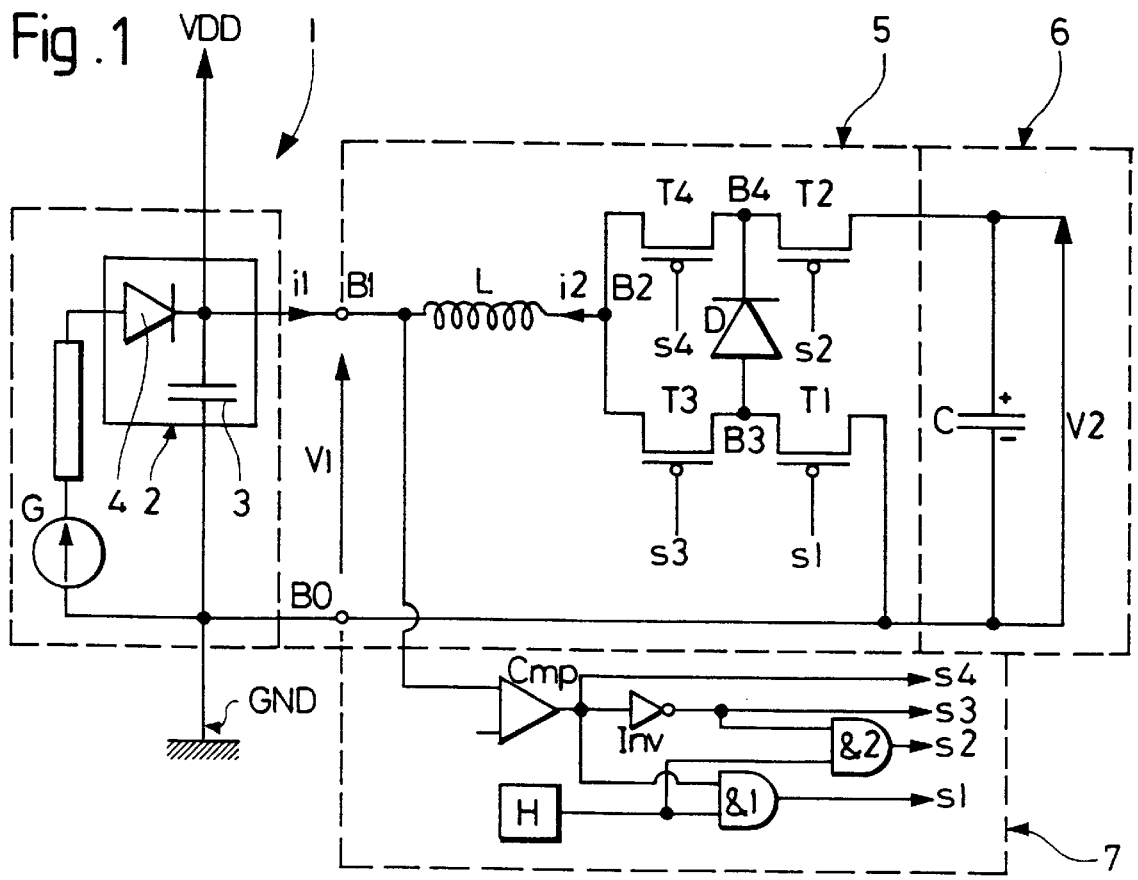
FIG. 1 represents a continuous electric power supply circuit according to the invention comprising a dc/dc reversible converter, coupled to a capacitor.

In its embodiment as represented schematically and by way of a non-limitative example in FIG. 1, the continuous supply circuit 1 normally provides a continuous voltage at supply terminals $V_{DD}$ and GND, the reference voltage being conventionally taken at the terminal GND, which is connected to the ground.

Continuous supply circuit 1 comprises an intermittent electric source G which may be a current generator or a voltage generator, such as a photovoltaic battery, or an alternating electric generator driven for example by a mechanical movement. This source G is preferably connected to a regulator 2 connected to supply terminals $V_{DD}$ and GND, the regulator 2 equalising the output voltage $V_{DD}$.

These circuits are well known to specialists and will not be described in detail here. It will be simply mentioned that a classical regulator 2 comprises a capacitor 3 and possibly a rectifying diode 4, or a diode which avoids a returning of the current to the source. The terminals $V_{DD}$ and GND constitute here the power supply output. Electric power consuming circuits, such as a motor or such as electronic regulating circuits of the movement of a timepiece, are connected to these terminals $V_{DD}$ and GND. Capacitor 3 functions as a principal supply source of circuits/motors which are connected to these terminals $V_{DD}$ and GND because the energy generated by the intermittent electric source G is stored, at least initially, across its electrodes.

Continuous supply circuit 1 further comprises a converter 5 coupled to secondary energy storing means 6, constituted by a capacitor C. Converter 5 is coupled in parallel to capacitor 3 by terminals $B_0$ and $B_1$.

In a normal state, the intermittent electric source G and, as the case may be, diode 4 provide the electric power to capacitor 3 which is intended for the consuming circuit. Converter 5 deviates a part of this electric power and transfers it to storing means 6. The electrostatic energy stored in capacitor C thus increases. In the normal state, converter 5 is preferably a voltage multiplying dc/dc converter. Thus, the continuous low voltage $V_1 = V_{DD} - GND$ normally used in timepieces for supplying the low consumption circuits, may be raised to a relatively high voltage $V_2$ corresponding to a stored energy which is evaluated at $E = \frac{1}{2}.C.V_2^2$ which allows to dispose of an increased autonomy with respect to the energy accumulated in a capacity with the voltage $V_{DD}$ ($E = \frac{1}{2}.C.V_{DD}^2$).

During the secondary or backup state, when intermittent electric voltage G is failing, the energy E stored in capacitor C is released to the power supply 1 by electric converter means 5. This power must be provided at a substantially normal supply voltage $V_{DD}$. To this effect, the invention provides reversible converter means 5. Energy E which is stored at the continuous voltage $V_2$ of a large value is preferably reconverted by converter means 5 into an electric energy provided at a low voltage $V_1$. In the backup state, reversible converter means 5 thus preferably comprise a voltage dividing dc/dc converter.

It may also be possible to provide for converter means 5 which comprise two parallely disposed converting circuits, a first converter functioning in the forward direction as a voltage multiplier during the normal state, and the other converter functioning in the opposite direction as a voltage divider during the backup state.

However, the invention provides for converter means 5 which preferably comprise a unique reversible converter, the converter having two configurations corresponding to the two aforementioned operating modes. Converter 5 comprises to this effect integrated switching means, which are preferably static, i.e. which switch without mechanical movement, such as field effect transistor or thyristors. By acting on these switching means, the electric diagram of the converter is modified such that the direction and the electric conversion ratio are inverted.

The invention further provides for power measuring means of the power supplied and for control means of these static switches. These means allow to detect any lowering of the supply power and to control a modification of the configuration of converter 5 to restore the energy to the power supply. The preferred embodiment of the invention as illustrated in FIG. 1 thus comprises a reversible voltage multiplying dc/dc converter 5 in the forward direction in the first configuration, and switching means allowing the converter to obtain a second configuration in which it is a voltage divider in the opposite direction. In the forward direction, the continuous voltage $V_1$ at terminals $B_0$, $B_1$ of reversible converter 5, is multiplied to a continuous voltage $V_2$ at the terminals of capacitor C, voltage $V_2$ having a value which is larger than voltage $V_1$. In the opposite direction, continuous voltage $V_2$ at terminals +, − of capacitor C is divided into a continuous voltage $V_1$ provided at terminals $B_0$, $B_1$, of reversible converter 5, voltage $V_1$ thus having a value which is smaller than voltage $V_2$.

Reversible converting circuit 5 of FIG. 1 comprises, for example, at least an inductance L and a switching circuit comprising four static switches $T_1$, $T_2$, $T_3$, $T_4$ and a diode D. The switching circuit has the shape of the Latin letter "A". One end $B_2$ of inductance L is connected to a terminal $B_3$ via a static switch $T_3$, terminal $B_3$ being connected to a terminal "−" of capacitor C via switch $T_1$. Furthermore, the end $B_2$ of inductance L is connected to a terminal B4 via a static switch $T_4$, terminal $B_4$ being connected to a terminal "+" of capacitor C via the switch $T_2$. Diode D connects terminal $B_3$ to terminal $B_4$, the cathode of the diode being oriented toward terminal $B_4$. Finally, terminal "−" of capacitor C is connected to terminal $B_0$ of converter 5, terminal B1 being constituted by the other end B1 of inductance L. It should be noted that inductance L is connected in series with switching circuit 5 between terminal $B_1$ and the terminal "+" of capacitor C.

Conventionally speaking, as terminal $B_0$ is connected to ground GND, its potential is considered being zero. In the following of the description it will further be considered that the source provides a positive voltage V1, i.e. that the potential of terminal B1 is positive. During operation, converter 5, in the embodiment according to FIG. 1, thus provides a positive voltage $V_1$ to the terminals of capacitor C, i.e. the potential of terminal "+" is positive.

Static switches $T_1$, $T_2$, $T_3$, $T_4$ are preferably field effect transistors or, more specifically, P-type or N-type MOS transistors obtained by the CMOS technology. They respectively receive control signals s1, s2, s3, s4 at their gates. In FIG. 1, to facilitate the understanding, the switches are represented by way of P-channel transistors, i.e. the channel is conducting if the control signal applied to the gate is in the state "0", i.e. that the gate voltage is lower than the source voltage of these FET transistors. Other alternatives of the switch are well known to the skilled person and may be used thereby remaining within the scope of the invention.

In the first configuration, switch 4 is open and switches $T_3$ and $T_2$ are closed. Finally, switch $T_1$ is alternatively closed then opened. For example, the P-channel transistors $T_4$, $T_3$, $T_2$, $T_1$ as illustrated in FIG. 1 respectively receive a gate signal s4 in the state "1";

a gate signal s3 in the state "0";

a gate signal s2 in the state "0", and on the gate of transistor $T_1$ a pulse signal si varing from state "0" to state "1".

Figure 2:
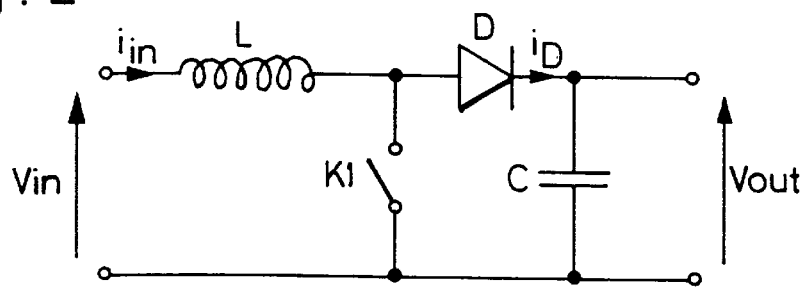
FIG. 2 represents a diagram of a part of the electric continuous power supply circuit of FIG. 1 when the latter is in a normal charging state.

In this configuration the electrical diagram of the converter is equivalent to that of FIG. 2, with the pulse controlled switch $T_1$ corresponding to the interrupter $K_1$. The latter is alternatively closed than opened by a so-called analogue "cut-off" control of control signal s1. When the interrupter $K_1$ is closed, the voltage $V_1$ as visible in FIG. 1, and corresponding to the voltage $V_1$ visible in FIG. 2, is applied to inductance L such that the current $I_{in}$ increases in this inductance. The opening of the interrupter $K_1$ forces the current $I_{in}$, which cannot be discontinuous in an inductance, to charge capacitor C via diode D. Diode D avoids a discharge of capacitor C when the interrupter $K_1$ is closed during the following "cut-off" cycle. At each close-opening cycle of interrupter $K_1$, capacitor C receives a supplementary charge which increases its voltage $V_{out}$ corresponding to $V_2$ in FIG. 2. It should be noted that this configuration of parallel sampling causes a voltage multiplying with the ratio of the output voltage $V_{out}$ and the input voltage $V_{in}$ being multiplied, corresponding to the following equation:

$$\frac{V_{OUT}}{V_{IN}} = \frac{V2}{V1} = \frac{1}{1-f}$$

in which f is the closing rate of interrupter $K_1$, (respectively of switch $T_1$), i.e. f is the ratio of the duration of the closing with respect to the duration of the closing-opening cycle.

In the second configuration, switches $T_4$ and $T_1$ are closed, and switch $T_3$ is open. Finally, switch $T_2$ is alterningly closed then opened. For example, the P-channel transistors $T_4$, $T_3$, $T_2$, $T_1$ as illustrated in FIG. 1 respectively receive:

- a gate signal s4 in the state "0";
- a gate signal s3 in the state "1";
- on the gate of transistor $T_2$ a pulse signal s2 which varies from the state "0" to the state "1", and
- a gate signal s1 in the state "0".

Figure 3:
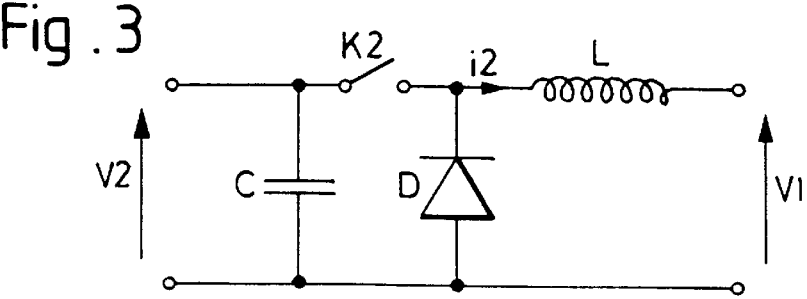
FIG. 3 represents a diagram of a part of the electric continuous power supply circuit of FIG. 1 when the latter is in a backup state.

In this second configuration the electrical diagram of the converter is equivalent to the one of FIG. 3, the pulse controlled switch $T_2$ corresponding to interrupter $K_2$. Thus, the reversible converter of FIG. 1 is used according to the invention to reconvert the electric power in the opposite direction going from capacitor C to capacitor 3. The converter thus converts electric static energy which is stored in capacitor C at a continuous voltage of $V_2$ into an electric energy at continuous voltage $V_1$ for the continuous electric power supply.

In fact, in the second configuration of the reversible converter according to the invention, switch $T_2$, which corresponds to interrupter $K_2$ in FIG. 3, is alternatively opened or closed by the control s2. Control s2 corresponds to the above-mentioned "cut-off control", the controls s1 and s2 are interchangeable when changing configurations. In the second configuration, when switch $T_2$ corresponding to interrupter $K_2$ of FIG. 3 is closed, capacitor C discharges across inductance L with a discharge current $i_2$ which provides the energy to capacitor 3. Current $i_2$, illustrated in FIGS. 1 and 3, provokes a voltage drop when crossing inductance L so that the voltage $V_1$ between terminals $B_1$ and $B_0$ of converter 5 has a lower value than the voltage $V_2$ of the terminals of capacitor C. When switch $T_2$, analogue to interrupter $K_2$ in FIG. 3, is open, a current $i_2$ continues to circulates in diode D, in inductance L and in capacitor 3.

In should be noted that in the second configuration according to the conventions of FIGS. 1 and 3, current $i_2$ and voltage $V_1$ are positive such that converter 5 is an electric power generator intended for power supply. In the first configuration, converter 5 in on the contrary a consumer of electric power because voltage $V_1$ and current $i_1$ are positive according to the convention of FIG. 1 (current $i_1$ is in the direction opposite to that of current $i_2$).

It should further be noted that, in this second configuration of series sampling, the converter lowers the voltage with the ratio of the continuous voltage $V_2$ at the terminals of the capacitor and the continuous voltage $V_1$ at the terminals of converter 5 being divided corresponding to the following equation:

$$\frac{V1}{V2} = f$$

in which f is the closing rate of switch $T_2$ (or of interrupter $K_2$), i.e. the ratio of the duration of closing with respect to the duration of the closing-opening cycle of the second configuration.

The values of the ratio of multiplication and of division of the continuous voltages indicated herebefore are however simply indicative. If we would like to obtain a specific value of the supply voltage $V_{DD}$, it would be preferable to assure that the closing ratio of switches $T_1$ and $T_2$ is slaved to a measurement of the value of voltage $V_{DD}$ at the output of the regulator or of the voltage $V_1$ at the terminals of converter 5.

Advantageously, this measurement may be combined with the measurement of the electric power of the supply or of the source which controls the modification of the configuration of the reversible converter.

An embodiment will now be described with reference to FIG. 1 which is solely an example of a control circuit of the switching means. Control circuit 7 comprises measurement means Cmp of the electric power provided by the source and comprises control means, for example a pulse generator H and a logic circuit, connected to switches $T_1$, $T_2$, $T_3$, $T_4$ of converter 5. The functioning of the logical circuit of FIG. 1 will be described by way of example, considering firstly that the supply voltage $V_{DD}$ is sufficient. Voltage $V_1$ thus is high and the output of comparator Cmp is in a state "1".

Signal s4, obtained directly, is in a state "1";

Signal s3, obtained at the output of an inverter, is in a state "0";

Signal s2, obtained at the output of a gate &2 performing the logic operation AND between the signal s3 and the pulse signal H, is in a state "0", and Signal s1, obtained at the output of a gate &1 performing the logic operation AND between the signal s4 and the signal of the pulse generator H, duplicates the pulse signal H.

Control circuit 7 thus puts converter 5 into the first configuration.

When the source starts failing or when the electronic circuits of the timepiece start consuming too much electric power, the supply voltage $V_{DD}$ becomes insufficient. Voltage $V_1$ is thus low and the output of comparator Cmp changes to the state "0".

Signal s4 directly obtained is in a state "0";

Signal s3, obtained at the output of an inverter, is in a state "1";

Signal s2 duplicates the pulse signal H; and

Signal s1 is in a state "0".

When the source starts failing, the control circuit 7 thus disposes the converter 5 in the second configuration.

According the a non-illustrated embodiment, the control means 7 may advantageously control the closing ratio f of switches $T_1$ or $T_2$ (according to the configuration). Control circuit 7 may for example comprise a generator of pulses H having variable widths. In the second configuration, the width of the pulses may thus be controlled by the measurement means of the voltage $V_1$ provided by converter 5. As such any variations of the energy and of voltage $V_2$ of the capacitor C during its discharge on voltages $V_1$ and $V_{DD}$ can be avoided. In the first configuration, a measurement of the charge voltage $V_2$ of capacitor C may be provided, the measurement controlling the closing ratio f of switch $T_1$, so that the ratio f increases according to the charge of the capacitor. As such, one can avoid that the components of converter 5 undergo very high currents and/or voltages.

It should further be mentioned that the control of converter 5 may comprise three phases, two phases corresponding to the aforementioned configurations, the converter being in operation in a forward direction or in a reversed direction, and the supplementary phase corresponding to the none-functioning of the converter. In this phase of none-functioning, the converter does not transmit any electric power, neither in the forward direction towards capacitor C nor in the reverse or opposite direction towards power supply 1. The converter may be simply disconnected, the switch $T_1$ and $T_2$ being open (control signals s1 and s2 being in the state "0"). Thus, capacitor C conserves the energy E which it had already stored. This phase may be inserted between the passage of one configuration to another to avoid switching problems. More generally, this phase may be controlled when the power of the source G is sufficient to supply the electronic circuits of the timepiece but when this power is too weak to further supply the converter 5 and the capacitor C.

An advantage of the continuous electronic supply circuit according to the invention is that the converter 5 may use the same inductance L and the same diode D in these configurations. More specifically, in a timepiece application, inductance L may be a winding of an inductive motor such as a stepping motor. In this case, an other advantage of the continuous electronic supply circuit according to the invention occurs, i.e. the transistors $T_1$ to $T_4$ may be constituted by the control transistors of the watch motor. A continuous electronic supply circuit is thus advantageously obtained which has small dimensions and which only requires a minimal number of components.

Figure 4:
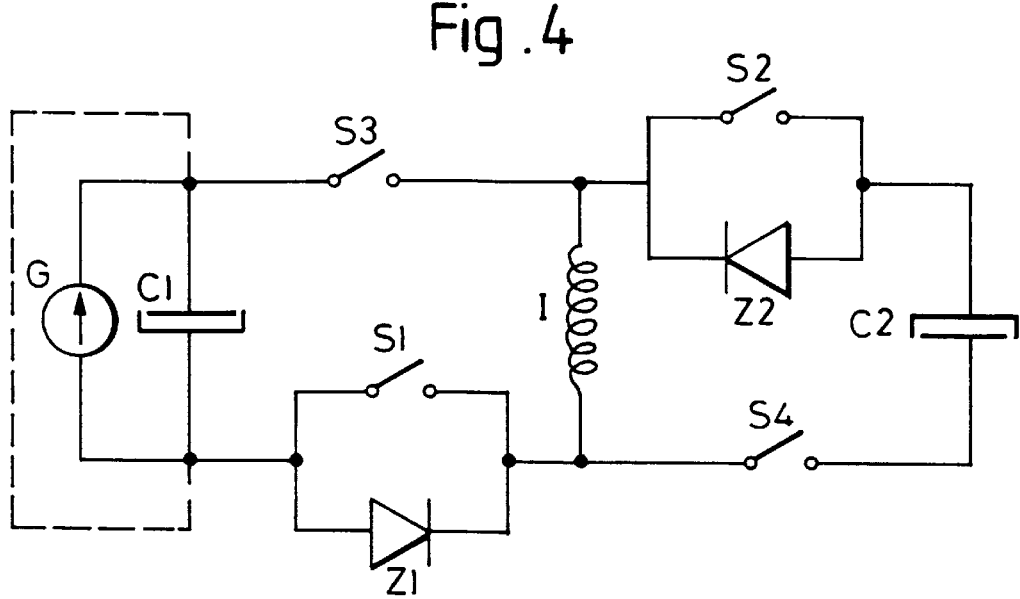
FIG. 4 represents another embodiment of the electric continuous supply circuit according to the invention.

Other embodiments of the dc/dc reversible converter may be foreseen. A second embodiment, illustrated in FIG. 4, comprises a converter which is coupled, on the onehand, to a capacitor C1 which may be the capacitor of supply 1, and, on the other hand, to a storing capacitor C2.

In this second embodiment, the converter has the shape of the Latin letter "H", the feet of the "H" being connected to the terminals of capacitor C1, and the tops of the "H" being connected to the terminals of the capacitor C2. Inductance L forms here the bar of the "H". Four static switches $S_1$, $S_2$, $S_3$, $S_4$ are disposed in the respective straight ends of the "H". The circuit further comprises two diodes Z1, Z2, respectively disposed in a top part of the "H" and in a bottom part of the "H", each diode being connected in parallel to a switch, for example respectively S1, S2.

As is the case for the preferred embodiment, this second reversible converter may have two configurations. In the first, it converts the voltage $V_1$ available at the terminals of capacitor C1 into a voltage V2 applied to capacitor C2. In the second configuration, it reconverts the energy E stored in the capacitor C2 at a voltage V2 into an electric power which is released to capacitor C1 and to power supply 1 at a voltage $V_1$.

In the second embodiment, the switching means S1, S2, S3, S4 configure the inductive accumulating sampling converter. This sampler comprises a switch S connected in series with a diode Z between the terminal "+" of capacitor c1 and a terminal "−" of capacitor C2, the anode of the diode Z being connected to the terminal "−" of capacitor C2. The terminal "−" of capacitor C1 and the terminal "+" of capacitor C2 are connected together by a wire, forming preferably a grounded wire. The inductance L is connected between the cathode of diode Z and the grounded wire. The sampling circuit thus forms an "H".

Figure 5:
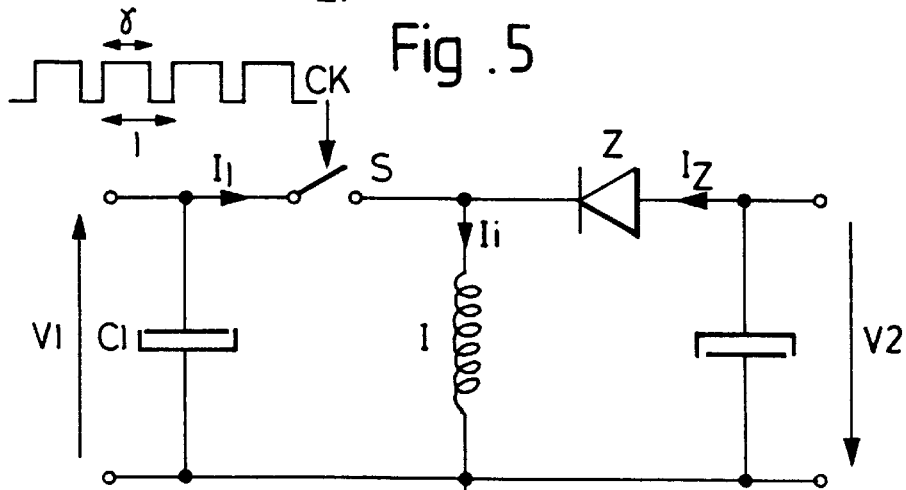
FIG. 5 represents a diagram of the electric continuous power supply circuit of FIG. 4.

During operation, switch S is closed then opened by a pulse signal CK called "sampling control". This sampling configuration has the characteristic of lowering or of increasing the voltage according to the closing rate f of switch S. The ratio of the output voltage $V_2$ to the input voltage $V_1$, such as may be seen in FIG. 5, is in fact given by the following equation $$\frac{V2}{V1} = \frac{f}{1-f}$$

In this second embodiment, the converter becomes reversible simply by inversing its configuration. The control of switches S1, S2, S3, S4 is similar to the control of the four switches of the preferred embodiment. It should however be mentioned that in the first configuration, the converter of FIG. 4 corresponds to the inductive accumulating sampler of FIG. 5, this sampler converting the voltage $V_1$ into the voltage $V_2$ in the forward direction. In the second configuration, it can be seen in FIG. 4 that the converter may take on a symmetrical configuration of the inductive accumulating sampler in the reverse direction, the voltage $V_2$ being reconverted into the voltage $V_1$. In this embodiment, the converter has a first configuration and a second similar configuration because the voltage in the forward direction may be increased by a closing rate f which is larger than ½ and may be decreased in the opposite direction by a closing rate f which is smaller than ½. Thus, a storing of energy E at a high voltage $V_2$ in a capacitor C2 may be obtained according to the invention.

In another embodiment, the diode or the diodes mentioned hereabove may be replaced by active diodes, i.e. by diodes which comprise at least one active element, such as an operational amplifier, a comparator, a transistor or a similar element, which requires a power supply source.

Figure 6:
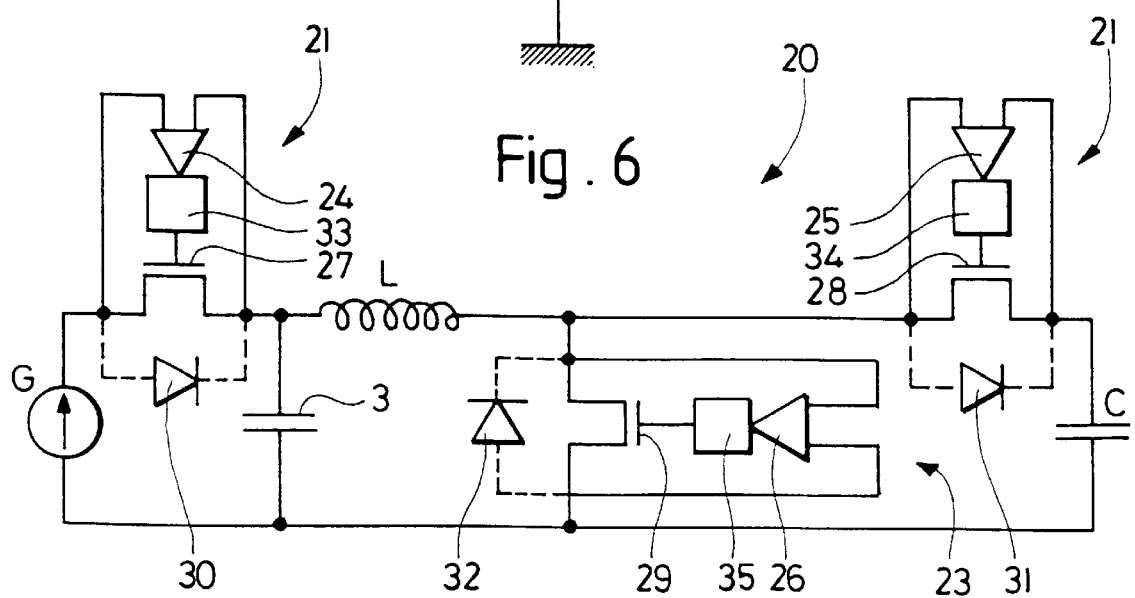
FIG. 6 represents another embodiment of the electric continuous power supply circuit according to the invention.

To this effect, FIG. 6 represents a diagram of a continuous supply circuit 20 comprising an intermittent electric source G, the capacitor 3, inductance L and the aforementioned capacitor C. The continuous supply voltage 20 further comprises active diodes 21, 22 and 23.

The active diodes 21, 22, and 23 respectively comprise comparators 24, 25 and 26 as weil as FET transistors 27, 28 and 29. Each of these active diodes functions in an identical manner. When considering the case of active diode 21, the positive input and the negative input of comparator 24 are connected to the drain and to the source of the FET transistor 27. The output of comparator 24 is connected to the gate of transistor 27.

Further, it is known that a parasite diode is created when an FET transistor is diffused in a substrate, this parasite diode being in fact connected between the source and the drain of the FET transistor. Thus, active diodes 21, 22 and 23 further comprise parasite diodes which are referenced 30, 31 and 32 in FIG. 6.

During starting up, i.e. when a current is provided to active diode 21 for the first time, this current passes through the parasite diode. This creates a voltage drop across active diode 21 which can be around 650 mV. This voltage drop is detected at the input of comparator 24. As a consequence, comparator 24 applies a control signal to the gate of transistor 27 so that the latter becomes conductive and that the parasite diode 30 is short-circuited. This provokes a drop of the residual voltage across active diode 21, for example, from about 650 mV to 50 mV. Active diode 21 stays conductive as along as there is a current provided to this diode, in this case by the intermittent electric source G.

Continuous supply circuit 20 of FIG. 6 further comprises control circuits 33, 34 and 35 respectively connected between the output of comparator 24 and the gate of transistor 27, between the output of comparator 25 and the gate of transistor 28 and between the output of comparator 26 and the gate of transistor 29. These logic circuits are arranged so as to decide, as a function of external elements or phenomena (for example the control means 7) if active diodes 21, 22 and 23 are used as actual diodes or if transistors 27, 28 or 29 which are parts of these active diodes, are more used as switching transistors.

Thanks to these control circuits, continuous supply circuit 20 may be configured either according to the diagram of FIG. 2, or according to the diagram of FIG. 3. Indeed, if control circuit 35 applies a series of pulses to the gate of transistor 29 so that the latter functions as the switch K1 described hereabove, it can be seen that continuous supply circuit 20 takes on the configuration represented in FIG. 2. Also, if control circuit 34 applies a series of pulses to the gate of transistor 28 in such a way that the latter functions as does switch K2 described hereabove, it can be seen that continuous supply circuit 20 takes on the configuration as represented in FIG. 3.

Advantageously, such an arrangement allows to minimalise the number of elements which can not be integrated with the continuous supply circuit because external diodes are not anymore necessary. Furthermore, this arrangement allows to considerably reduce the unnecessary voltage losses of the continuous supply circuit.

Other configurations of the reversible converter may be obtained, a large number of variations being known to specialists, as results from the preceding description.

What is claimed is:

1. A continuous supply electronic circuit for a timepiece, comprising:

a power supply source of said electronic circuit arranged to store energy for supplying the timepiece;

an intermittent electric source arranged to provide energy to said supply source wherein said supply electronic circuit further comprises:

secondary energy storing means arranged to provide energy to said power supply source when said intermittent electric source does not provide energy to said power supply source; and an electric dc/dc reversible converter, coupled, on the one hand, to said power supply source, and, on the other hand, to the secondary energy storing means, the converter comprising switching means, and control means acting on said switching means so as to modify the configuration of said converter between a first configuration in which said converter transfers, in a forward direction, the energy coming from the intermittent electric source to the secondary energy storing means, and a second configuration in which the converter releases, in the opposite direction, the energy storied by the secondary energy storing means to said power supply source.

2. A supply circuit according to claim 1 wherein said converter is a dc/dc converter, and wherein said control means act on said switching means in such a way that said converter is either a voltage multiplier in said first configuration or is a voltage divider in said second configuration.

3. A supply circuit according to claim 1, wherein said control means act on said switching means in such a way that said converter is a parallel sampler in said first configuration, and that said converter is a series sampler in said second configuration.

4. A supply circuit according to claim 2, wherein the converter is an inductive accumulating sampler in each of said configurations, and wherein said control means are arranged in such a way as to regulate the cut-off of the sampling so that the converter is a voltage multiplier in said first configuration and so that said converter is a voltage divider in said second configuration.

5. A supply circuit according to claim 1, wherein the converter comprises an accumulating inductance in each of said configurations, the same inductance being used in said first and in said second configuration.

6. A timepiece comprising a supply circuit according to claim 1.

7. A timepiece driven by a movement having an inductive electric motor, such as a stepping motor, and comprising a supply circuit according to claim 1, wherein at least one sampling inductance is an inductance of the motor.

8. A timepiece according to claim 6, wherein the continuous intermittent electric source comprises a photovoltaic battery.

9. A supply circuit as claimed in claim 2 wherein said control means act on said switching means in such a way that said converter is a parallel sampler in said first configuration, and that said converter is a series sampler in said second configuration.

10. A supply circuit as claimed in claim 2, wherein the converter comprises an accumulating inductance in each of said configurations, the same inductance being used in said first and in said second configuration.

11. A supply circuit as claimed in claim 3, wherein the converter comprises an accumulating inductance in each of said configurations, the same inductance being used in said first and in said second configuration.

12. A supply circuit as claimed in claim 4, wherein the converter comprises an accumulating inductance in each of said configurations, the same inductance being used in said first and in said second configuration.

13. A timepiece comprising a supply circuit according to claim 2.

14. A timepiece comprising a supply circuit according to claim 3.

15. A timepiece comprising a supply circuit according to claim 5.

16. A timepiece driven by a movement having an inductive electric motor, and comprising a supply circuit according to claim 2 wherein at least one sampling inductance is an inductance of the motor.

17. A timepiece as claimed in claim 16 wherein the motor is a stepping motor.

18. A timepiece driven by a movement having an inductive electric motor, and comprising a supply circuit according to claim 5 wherein at least one sampling inductance is an inductance of the motor.

19. A timepiece as claimed in claim 18 wherein the motor is a stepping motor.

20. A timepiece according to claim 7 wherein the continuous intermittent electric source comprises a photovoltaic cell.

* * * * *